United States Patent
Nishidate

(10) Patent No.: US 9,065,308 B2
(45) Date of Patent: Jun. 23, 2015

(54) SPINDLE MOTOR WITH BEARING HOLDER HAVING A BOTTOM INTERIOR STEP

(71) Applicant: Masahiro Nishidate, Gunma-ken (JP)

(72) Inventor: Masahiro Nishidate, Gunma-ken (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 92 days.

(21) Appl. No.: 13/692,336

(22) Filed: Dec. 3, 2012

(65) Prior Publication Data

US 2013/0207489 A1 Aug. 15, 2013

(30) Foreign Application Priority Data

Feb. 14, 2012 (JP) ................. 2012-029171

(51) Int. Cl.
| | |
|---|---|
| H02K 15/12 | (2006.01) |
| H02K 5/16 | (2006.01) |
| F16C 32/06 | (2006.01) |
| H02K 7/08 | (2006.01) |
| H02K 5/167 | (2006.01) |
| F16C 33/72 | (2006.01) |
| F16C 33/74 | (2006.01) |
| F16C 33/10 | (2006.01) |

(52) U.S. Cl.
CPC ............. *H02K 7/08* (2013.01); *H02K 5/1675* (2013.01); *F16C 2370/12* (2013.01); *F16C 33/723* (2013.01); *F16C 33/74* (2013.01); *F16C 33/104* (2013.01)

(58) Field of Classification Search
CPC ........... H02K 15/03; H02K 7/08; F16C 33/10
USPC ............................... 310/45, 90; 384/100, 107
See application file for complete search history.

(56) References Cited

U.S. PATENT DOCUMENTS

| | | | | |
|---|---|---|---|---|
| 6,250,807 B1 * | 6/2001 | Mori et al. | ..................... | 384/100 |
| 2003/0113045 A1 * | 6/2003 | Fujinaka | ....................... | 384/100 |
| 2003/0123375 A1 * | 7/2003 | Uno et al. | ..................... | 369/263 |
| 2006/0031867 A1 * | 2/2006 | Ikemoto | ....................... | 720/707 |
| 2007/0228851 A1 * | 10/2007 | Smirnov et al. | ................. | 310/90 |
| 2008/0277845 A1 * | 11/2008 | Fujii et al. | ................. | 267/64.13 |

FOREIGN PATENT DOCUMENTS

JP 8-289523 11/1996

* cited by examiner

*Primary Examiner* — Jose Gonzalez Quinone
(74) *Attorney, Agent, or Firm* — Jordan and Hamburg LLP

(57) ABSTRACT

In addition to a bearing holder being provided with an annular groove that opens down in the axial direction, an end cap is provided with an annular projection that extends up in the axial direction, and by way of press-fitting the projection into the groove, the fitted portion of the bearing holder and the end cap is forms an axially convex labyrinthine shape extending along the entire perimeter.

4 Claims, 9 Drawing Sheets

SPINDLE MOTOR WITH BEARING HOLDER HAVING A BOTTOM INTERIOR STEP

BACKGROUND OF THE INVENTION

1. Field of the Invention

The present invention relates to a brushless motor that serves as a drive for electronic devices, such as spindle motors for rotating optical discs, magneto-optical discs, or the like.

2. Background of the Invention

Brushless motors serve as spindle motors to drive the rotation of a disc in optical disc devices for CDs, DVDs, MDs, or the like, and magneto-optical disc devices. Brushless motors of this type include, for example, the device having the configuration shown in FIG. 9, which is disclosed in Japanese Patent Laid-Open Publication No. H8-289523.

In the brushless motor of FIG. 9, a rotor is configured so that a ring-shaped magnet 103 is fixed to the interior of the rotor case 102, which is press-fit to the upper portion of the rotor shaft (shaft) 101. Furthermore, an oil-impregnated metal (oil-impregnated sintered metal) 105, which rotatably supports the rotor shaft 101, is press-fit in the interior of a tube-shaped bearing holder 104 that is united with a printed circuit board 107, and an end cap (bottom cover) 109, on which an abrasion resistant thrust plate (resin plate) 110 is disposed, is fixed on the bottom opening of the bearing holder 104. A retaining part 108, which prevents separation in the direction of the rotor thrust, is fixed to the bottom of the rotor shaft 101. Furthermore, an armature 106, wherein a copper wire is wound around a core with a resin insulator therebetween, is fixed to the outer circumferential side of the bearing holder 104.

With a brushless motor configured so as to have an inexpensive oil-impregnated metal serve as the bearing, it is important to prevent the lubricating oil of the oil-impregnated metal from leaking from the bearing holder. However, with the brushless motor of FIG. 9, there is a risk of the lubricating oil leaking because the mode is such that, the lubricating oil readily leaks from the gap due to gravity, if there is even a small gap between the end cap 109 and bearing holder 104.

If lubricating oil leaks from the bearing holder, sufficient lubricating oil cannot be maintained between the rotor shaft and bearings, so a problem occurs in that the performance as a plain bearing decreases, thus leading to louder rotary noise while the motor is driving, and a decrease in motor life. Furthermore, there is a risk that the performance of devices with internal motors will be negatively impacted by way of leaked lubricating oil; for example, there is a risk that a disc recording or playback error occurs with disc drive devices.

SUMMARY OF THE INVENTION

One or more of the embodiments of the present invention provides a highly reliable brushless motor, wherein leakage of the lubricating oil from the oil-impregnated metal is prevented.

According to one or more of the embodiments of the present invention, in a brushless motor comprising: a cylindrical bearing holder; an end cap that blocks the bottom opening of the bearing holder; and an oil impregnated metal that rotatably supports a rotor shaft and that is press-fit into the interior of the bearing holder, the bearing holder has an annular groove that opens down in the axial direction, the end cap has a bottom and an annular projection that extends up in the axial direction, and the projection is press-fit into the groove.

In the structure described above, the bearing holder may have a protrusion on the outer circumference of the groove, and the protrusion may be caulked to the outer circumference of the lower face of the bottom.

Furthermore, in the structure described above, the bearing holder may have a protrusion on the outer circumference of the groove; the end cap may have a step between the bottom and the projection; and the protrusion may be caulked to the outer circumference of the lower face of the step. In this case, it is preferable that: the rotor shaft has a recess in the region positioned in the lower part of the oil-impregnated metal; a rotor retaining washer is disposed on the upper face of the step of the end cap; and the inner diameter of the rotor retaining washer is inserted into the recess.

Moreover, in the structure described above, the rotor shaft can have a recess in the region positioned in the lower part of the oil-impregnated metal; the bearing holder can have a step in the bottom portion of the interior; a rotor retaining washer can be disposed on the upper face of the step; and the inner diameter of the rotor retaining washer can be inserted into the recess.

According to one or more of the embodiments of the present invention, in addition to providing an annular groove that opens down in the axial direction on a bearing holder, an annular projection that extends up in the axial direction is provided on the end cap, and the bottom opening of the bearing holder is blocked by way of press-fitting the projection into the groove. Thus, the fitted portion of the bearing holder and the end cap is an axially convex labyrinthine shape extending along the entire perimeter, and can effectively prevent the lubricating oil of the oil-impregnated metal from leaking from the bottom of the bearing holder.

DESCRIPTION OF THE PREFERRED EMBODIMENTS

Hereafter, embodiments of a brushless motor of the present invention are described with reference to the drawings.

First Embodiment

Figure 1:
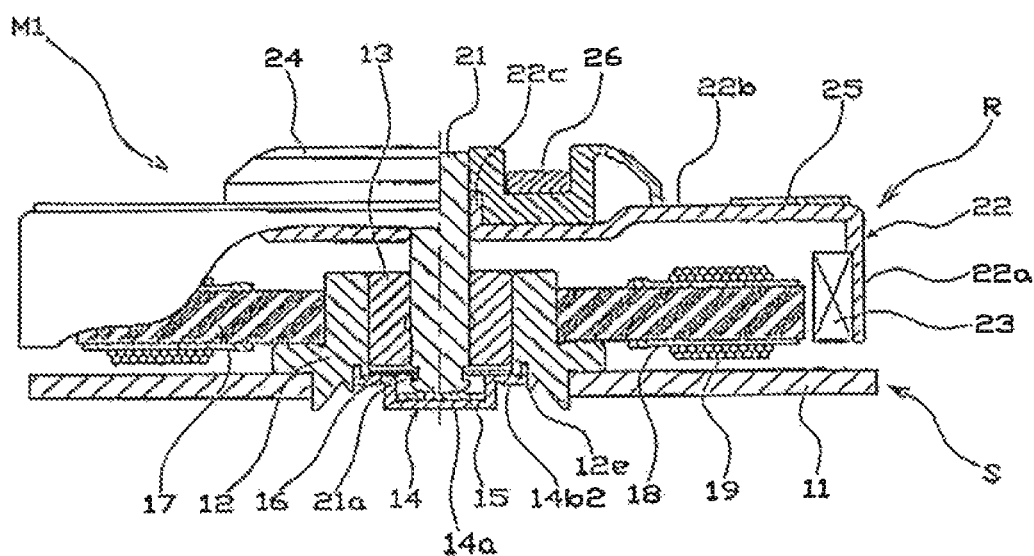
FIG. 1 is a side view a brushless motor M1 according to a first mode of embodiment of the present invention and shows a partial section.

FIG. 1 shows a brushless motor M1 according to a first embodiment of the present invention. The brushless motor M1 of this example can be used as a spindle motor for rotating an optical disc, magneto-optical disc, or the like, and primarily comprises a stator S and a rotor R.

The stator S has bearings that rotatably support a rotor R, and an armature, that is disposed around the bearings.

The bearings comprise a bearing holder 12, an oil-impregnated metal 13, an end cap 14, a thrust plate 15, and a rotor retaining washer 16.

Figure 2:
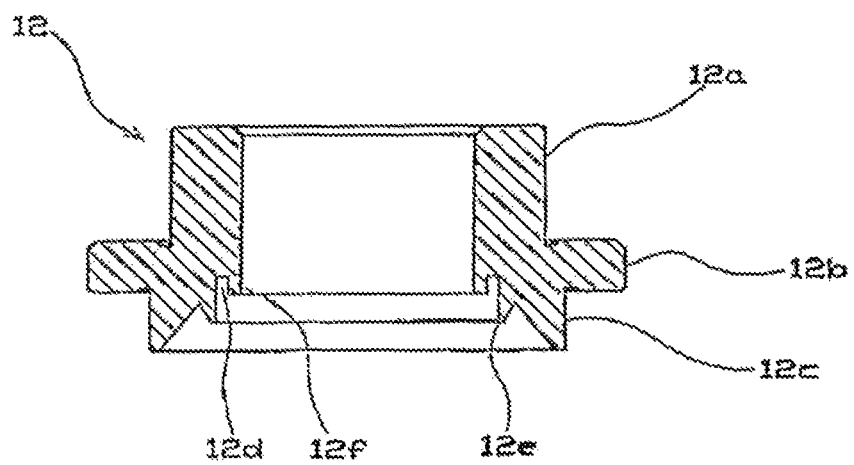
FIG. 2 is a longitudinal sectional view of a bearing holder in the brushless motor M1 of FIG. 1.

As shown in FIG. 2, the bearing holder 12 is formed into a cylindrical shape without a bottom, and, for example, can comprise machined brass parts. The bearing holder 12 comprises: a cylinder portion 12a, to which the oil-impregnated metal 13 is mounted; a flange portion 12b, which projects to the outside from the bottom of the cylinder portion 12a; a base mounting portion 12c, which projects under the flange portion 12b; an annular groove 12d, which opens downward in an axial direction; a protrusion 12e, which is disposed on the outer circumference of the groove 12d; and a annular wall 12f, which is disposed on the inner circumferential side of the groove 12d. Note that the protrusion 12e projects further down than the annular wall 12f in the axial direction for a prescribed amount.

In terms of the bearing holder 12, the base mounting portion 12c is press-fit and fixed to an opening in a base 11, wherein a steel plate is mounted overlaid on a so-called iron substrate, on the surface of which a printed circuit is formed, or wherein a printed wiring board is overlaid on a metal plate. Note that on the base 11, a Hall element (not shown) is provided facing a driving magnet 23, which is described below, so that the rotation of the rotor R can be detected by way of the Hall element.

Because the oil-impregnated metal 13 is the sintered metal of the cylinder impregnated with a lubricating oil, it is fixed to the inner circumference of the cylinder portion 12a of the bearing holder 12.

Figure 3:
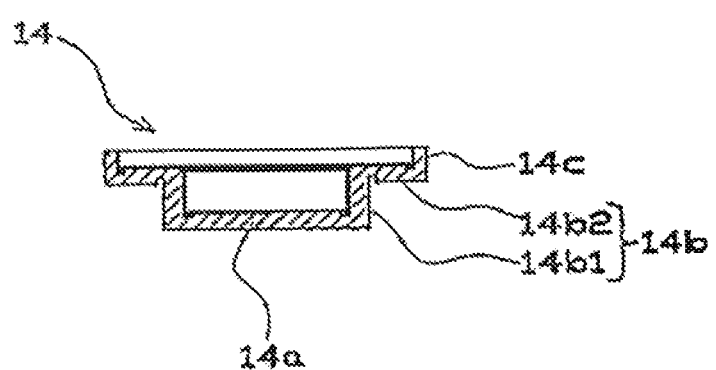
FIG. 3 is a longitudinal sectional view of an end cap in the brushless motor M1 of FIG. 1.

As shown in FIG. 3, the end cap 14 is a member that is integrally formed by metal press working, and comprises a bottom 14a, which is a plane, a step 14b, and a projection 14c. The step 14b comprises an annular standing portion 14b1, which rises up in the axial direction from the outer edge of the bottom 14a, and an extended portion 14b2, which extends toward the outer circumference from the top edge of the standing portion 14b1. The projection 14c annularly extends up in the axial direction from the outer edge of the extended portion 14b2. The projection 14c is press-fit into the groove 12d of the bearing holder 12 so that the end cap 14 blocks the bottom opening of the bearing holder 12.

An abrasion resistant thrust plate (resin plate) 15 is disposed on the bottom 14a of the end cap 14, and a ring-shaped rotor retaining washer 16 is disposed on the top of the extended portion 14b2 of the step 14b.

The armature comprises a stator core 17, a core cover 18, and a coil 19. The stator core 17 comprises a planar core laminate, on which a plurality of salient poles are formed, and is fixed to the outer circumference of the cylinder portion 12b while placed on the flange portion 12b of the bearing holder 12. The core cover 18, which is made from an insulating resin, is disposed on the surface of the stator core 17; the coil 19 is wound on with the core cover 18 therebetween.

The rotor R has a rotor shaft 21, a rotor case 22 that rotates united with the rotor shaft 21, and a driving magnet 23, which is fixed to the rotor case 21. The rotor shaft 21 is rotatably supported by way of the oil-impregnated metal 13, and the bottom edge is supported by way of the thrust plate 15. An annular recess 21a is formed in the region positioned below the oil-impregnated metal 13 of the rotor shaft 21; the inner diameter of the rotor retaining washer 16 is inserted into the recess 21a.

The rotor case 22 is formed from a magnetic plate into a cap shape, and has a cylinder portion 22a, which is formed into a cylinder coaxial with the rotor shaft 21, and a upper face 22b, which is slightly lower at the radial interior. The rotor shaft 21 is fixed to a burring 22c, which is provided in the center of the upper face 22b of the rotor case 22, by way of press-fitting.

The cylindrical driving magnet 23, which faces the salient poles of the stator core 17 in the radial direction, is mounted in the interior of the cylinder part 22a of the rotor case 22. The driving magnets 23 are N/S alternatingly multipole-magnetized in the circumferential direction. The upper face 22b of the rotor case 22 serves as a turntable, which rotates united with the rotor shaft 21, and on which a disc is removably disposed. Moreover, a disc guide 24 is disposed in the inner diameter of the upper face 22b, and a friction sheet 25 is disposed in the outer diameter of the upper face 22b.

The disc guide 24 is a member for guiding a disc concentric with the rotor shaft 21, and is formed from a hard resin. An annular clamping magnet 26 is disposed in a recess of the disc guide 24. The clamping magnet 26 is a member for holding a disc between a clamper, which is not shown, and the upper face 22b of the rotor case 22 by way of magnetically attracting the clamper toward the turntable.

As shown above, with a brushless motor M1 of this example, the annular groove 12d, which opens downward in an axial direction, is provided in the bearing holder 12, and the annular projection 14c, which extends upward in the axial direction, is provided in the end cap 14. Furthermore, the bottom opening of the bearing holder 12 is blocked with the end cap 14 by way of press-fitting the projection 14c into the groove 12d. Thus, the fitted portion of the groove 12d and the projection 14c is an axially convex labyrinthine shape extending along the entire perimeter, and can effectively prevent the lubricating oil of the oil-impregnated metal 13 from leaking from the bottom of the bearing holder 12.

Figure 4:
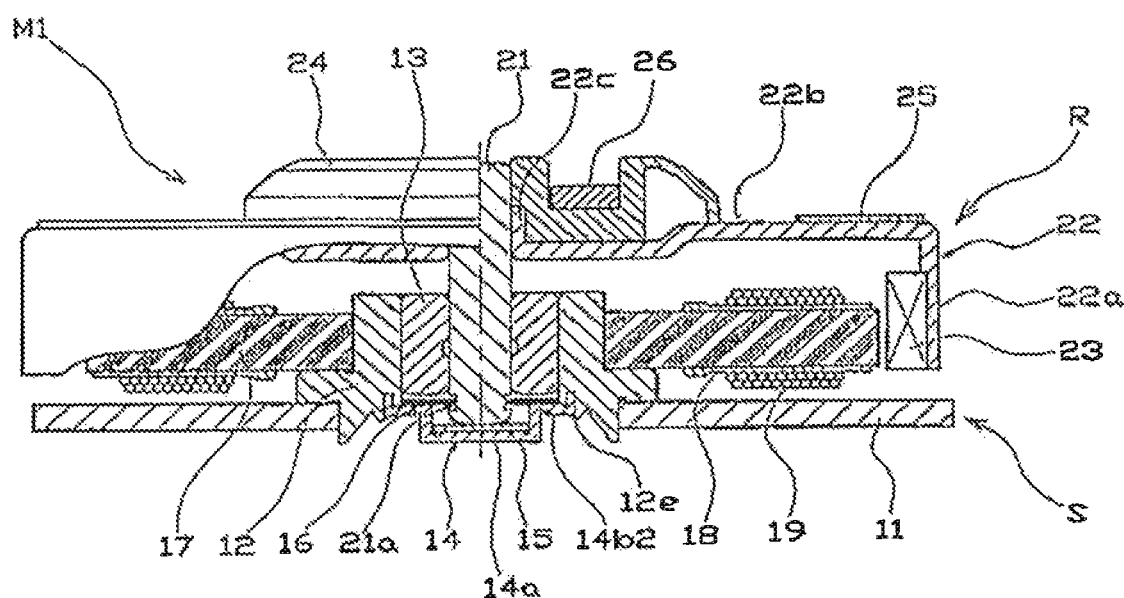
FIG. 4 is a side view showing the state, in the brushless motor M1 of FIG. 1, when a protrusion of a bearing holder is caulked to the outer circumference of the lower face of a step of an end cap and shows a partial section.

Moreover, with the brushless motor M1 of this example, a protrusion 12e, which has a prescribed height, is provided on the outer circumference of the groove 12d of the bearing holder 12, and when in a state where the projection 14c of the end cap 14 is press-fit into the groove 12d, the protrusion 12e projects further down than the lower face of the extended portion 14b2 of the end cap 14 (see FIG. 1). Furthermore, if the protrusion 12e is caulked to the outer circumference of the lower face of the step 14 (extended portion 14b2), as shown in FIG. 4, the end cap 14 can be more firmly assembled with the bearing holder 12. Thus, for example, separation of the end cap 14 from the bearing holder 12 by way of the thrust load acting from the rotor shaft 21 can be more reliably prevented, and as a result, leakage of the lubricating oil can be more reliably prevented.

Note that, while in a state where the projection 14c of the end cap 14 is press-fit into the groove 12d of the bearing holder 12 as shown in FIG. 1, by having the upper face of the extended portion 14b2 abut the lower face of the annular wall 12f or having the end of the projection 14c abut the bottom of the groove 12d, assembly when caulking the protrusion 12e can be very precise without the position of the end cap 14 shifting.

Moreover, with the brushless motor M1 of this example, a step 14b is provided in the end cap 14, and the rotor retaining washer 16 is disposed on the upper face of the step 14b (extended portion 14b2). Moreover, because the inner diameter of the rotor retaining washer 16 is inserted into the recess 21a of the rotor shaft 21, the rotor shaft 21 can be prevented from slipping out from the bearing holder 12 when used as a spindle motor.

Second Embodiment

Figure 5:
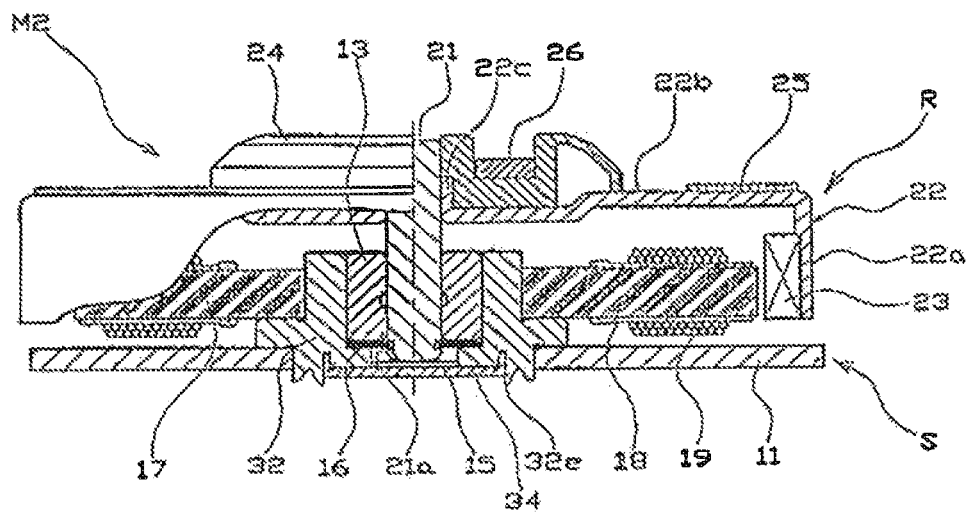
FIG. 5 is a side view a brushless motor M2 according to a second mode of embodiment of the present invention and shows a partial section.

FIG. 5 shows a brushless motor M2 according to a second embodiment of the present invention. Note that the brushless motor M2 of this example can also serve as a spindle motor. In FIG. 5, parts that are the same as parts in FIG. 1 are given identical reference numerals, and description of these parts is omitted.

The brushless motor M2 of this example differs from the brushless motor M1 of FIG. 1 in the shapes of the bearing holder and end cap.

Figure 6:
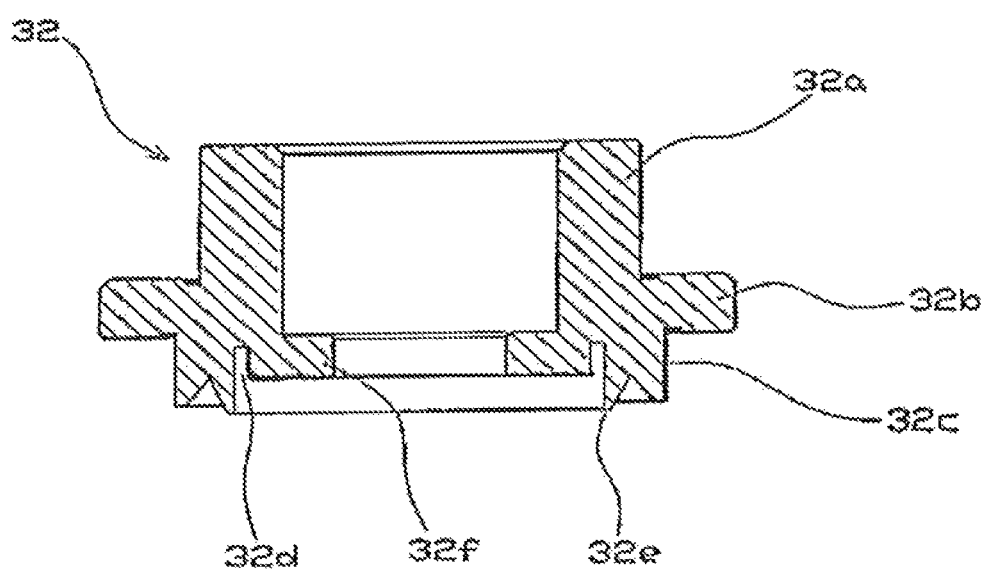
FIG. 6 is a longitudinal sectional view of a bearing holder in the brushless motor M2 of FIG. 5.

As shown in FIG. 6, the bearing holder 32 of this example is formed into a cylindrical shape without a bottom, and, for example, can comprise machined brass parts. The bearing holder 32 comprises: a cylinder portion 32a, to which the oil-impregnated metal 13 is mounted; a flange portion 32b, which projects to the outside from the bottom of the cylinder portion 32a; a base mounting portion 32c, which projects under the flange portion 32b; an annular groove 32d, which opens downward in an axial direction; a protrusion 32e, which is disposed on the outer circumference of the groove 32d; and a step 32f, which is disposed on the inner circumferential side of the groove 32d. Note that the protrusion 32e projects further down than the step 32f in the axial direction for a prescribed amount. Furthermore, the step 32f is formed in an annular shape, and the inner diameter of the step 32f is smaller than the inner diameter of the cylinder portion 32a and larger than the outer diameter of the rotor shaft 21.

Figure 7:
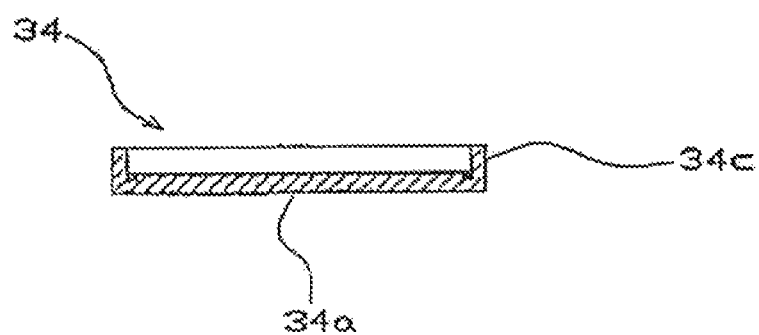
FIG. 7 is a longitudinal sectional view of an end cap in the brushless motor M2 of FIG. 5.

As shown in FIG. 7, the end cap 34 of this example is a member that is integrally formed by metal press working, and comprises a bottom 34a, which is a plane, and a projection 34c, which extends annularly upward in the axial direction from the outer edge of the bottom 34a. The projection 34c is press-fit into the groove 32d of the bearing holder 32 so that the end cap 34 blocks the bottom opening of the bearing holder 12.

A ring-shaped rotor retaining washer 16 is disposed on the top of the step 32f of the bearing holder 32, and an abrasion resistant thrust plate (resin plate) 15 is disposed on top of the bottom 34a of the end cap 34.

As shown above, with a brushless motor M2 of this example, the annular groove 32d, which opens downward in an axial direction, is provided in the bearing holder 32, and the annular projection 34c, which extends upward in the axial direction, is provided in the end cap 34. Furthermore, the bottom opening of the bearing holder 32 is blocked with the end cap 34 by way of press-fitting the projection 34c into the groove 32d. Thus, the fitted portion of the groove 32d and the projection 34c is an axially convex labyrinthine shape extending along the entire perimeter, and can effectively prevent the lubricating oil from the oil-impregnated metal 13 from leaking from the bottom of the bearing holder 32.

Figure 8:
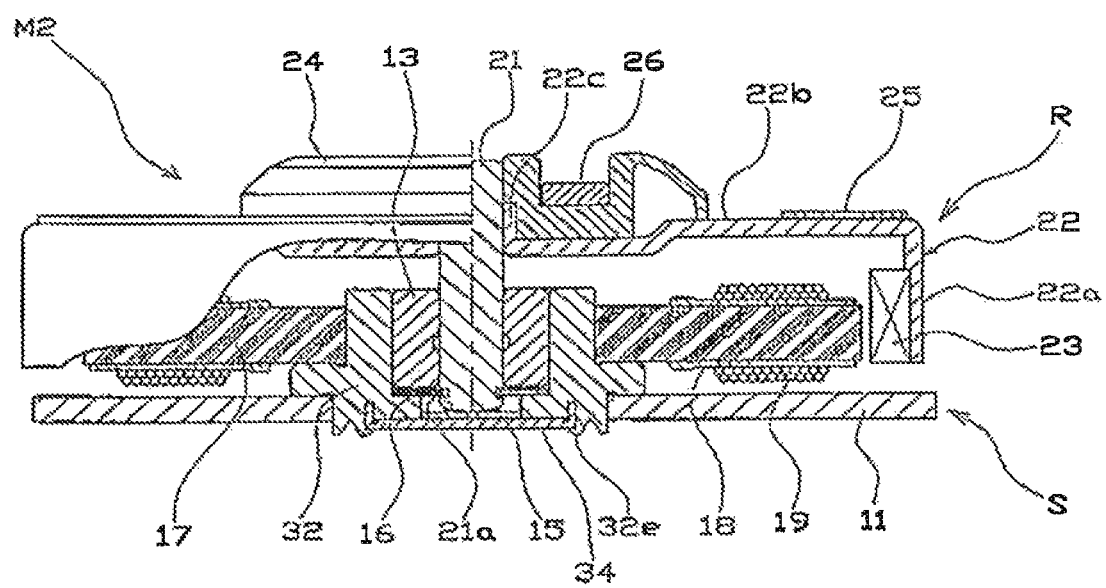
FIG. 8 is a side view showing, in the brushless motor M2 of FIG. 5, the state when a protrusion of a bearing holder is caulked to the outer circumference of the lower face of a step of an end cap and shows a partial section.
Figure 9:
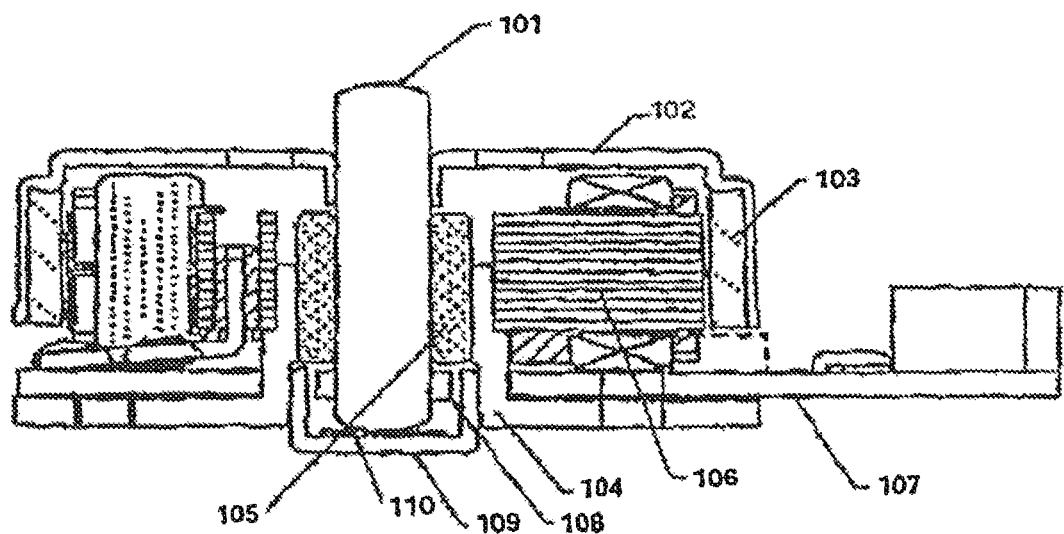
FIG. 9 is a sectional view showing a conventional brushless motor.

Moreover, with the brushless motor M2 of this example, a protrusion 32e, which has a prescribed height, is provided on the outer circumference of the groove 32d of the bearing holder 32, and with the projection 34c of the end cap 34 is press-fit into the groove 32d, the protrusion 32e projects further down than the bottom 34a of the end cap 34 (see FIG. 5). Furthermore, if the protrusion 32e is caulked to the outer circumference of the lower face of the bottom 34a, as shown in FIG. 8, the end cap 34 can be more firmly assembled with the bearing holder 32. Thus, separation of the end cap 34 from the bearing holder 32 by way of the thrust load acting from the rotor shaft 21 can be more reliably prevented, and as a result, leakage of the lubricating oil can be more reliably prevented.

Note that with the projection 34c of the end cap 34 is press-fit into the groove 32d of the bearing holder 32, as shown in FIG. 5, by having the upper face of the bottom 34a abut the lower face of the step 32f or having the end of the projection 34c abut the bottom of the groove 32d, assembly when caulking the protrusion 32e can be very precise without the position of the end cap 34 shifting.

Moreover, with the brushless motor M2 of this example, a step 32f is provided on the bottom of the interior of the bearing holder 32, and the rotor retaining washer 16 is disposed on the upper face of the step 32f. Moreover, because the inner diameter of the rotor retaining washer 16 is inserted into the recess 21a of the rotor shaft 21, the rotor shaft 21 can be prevented from slipping out from the bearing holder 32.

Embodiments of the present invention were described above, but the present invention is not limited to these embodiments, and the present invention can be suitably changed within the scope of the gist of the invention. For example, in terms of the rotor retaining structure, this is not limited to a combination of a recess 21a of a rotor shaft 21 and a rotor retaining washer 16, but conventionally known retaining structures may also be applied. Furthermore, in the embodiments above, the end cap is metallic, but, for example, when a resin, such as PPS resin, with excellent heat resistance, dimensional stability, and the like is used, the thrust plate 15 can be omitted.

The present invention can serve as an outer rotor type brushless motor.

DESCRIPTION OF REFERENCE NUMERALS AND SIGNS 11 base
12, 32 bearing holder
12a, 32a cylinder portion
12b, 32b flange portion
12c, 32c base mounting portion
12d, 32d groove
12e, 32e protrusion
12f annular wall
13 oil-impregnated metal
14, 34 end cap
14a, 34a bottom
14b step
14b1 standing portion
14b2 extended portion
14c, 34c projection
15 thrust plate
16 rotor retaining washer
17 stator core
18 core cover
19 coil
21 rotor shaft
21a recess
22 rotor case
22a cylinder portion
22b upper face
22c burring
23 driving magnet
24 disc guide
25 friction sheet
26 clamping magnet
32f step
M1, M2 spindle motor
R rotor
S stator

What is claimed is:

1. A spindle motor comprising:
a cylindrical bearing holder;
an end cap that blocks a bottom opening of the bearing holder; and
an oil impregnated metal that rotatably supports a rotor shaft and that is press-fit into an interior of the bearing holder; and
wherein the bearing holder has an annular groove that opens down in an axial direction;
wherein the end cap has a bottom and an annular projection that extends up in the axial direction, and the projection is press-fit into the groove;
wherein the rotor shaft has a recess in a region positioned in the lower part of the oil-impregnated metal;
wherein the bearing holder has a step in a bottom portion of the interior, a rotor retaining washer is disposed on an upper face of the step, and a lower face of the step abuts an outer diameter of the end cap; and
wherein an inner diameter of the rotor retaining washer is inserted into the recess.

2. The spindle motor of claim 1, wherein the bearing holder is formed in an annular shape, and an inner diameter of said step is larger than an outer diameter of said rotor shaft.

3. The spindle motor recited in claim 1, wherein the bearing holder has a protrusion on an outer circumference of the groove; the end cap has a step between the bottom and the projection; and the protrusion is caulked to an outer circumference of a lower face of the step.

4. The spindle motor of claim 3, wherein the step of the end cap comprises:
an annular standing portion that rises up in the axial direction from an outer edge of the bottom, and
an extended portion that extends toward an outer circumference from a top edge of the standing portion, and
wherein the projection annularly extends up in the axial direction from an outer edge of the extended portion.

* * * * *